United States Patent
Eschenburg

[15] 3,666,043
[45] May 30, 1972

[54] AIR DIVIDER RING STRUCTURE FOR JET ENGINE INLET AIR DUCT

[72] Inventor: Rodney Eschenburg, San Diego, Calif.
[73] Assignee: Rohr Corporation
[22] Filed: Nov. 12, 1970
[21] Appl. No.: 88,542

[52] U.S. Cl. ..........................................181/33 HA, 415/119
[51] Int. Cl. ........................................................G10k 11/04
[58] Field of Search..........................60/269, 226; 181/33.21; 415/119

[56] References Cited

UNITED STATES PATENTS

| | | | |
|---|---|---|---|
| 3,481,427 | 12/1969 | Dobbs....................................|415/119 |
| 3,477,231 | 11/1969 | Paulson..................................|60/269 |
| 2,869,670 | 1/1959 | Hoffman.................................|181/35 |
| 3,303,653 | 2/1967 | Hull........................................|60/226 A |
| 3,346,174 | 10/1967 | Lievens...................................|415/119 |
| 3,508,838 | 4/1970 | Martenson..............................|415/119 |

FOREIGN PATENTS OR APPLICATIONS 935,119  8/1963  Great Britain......................181/33.21

*Primary Examiner*—Clarence R. Gordon
*Attorney*—George E. Pearson

[57] ABSTRACT

One or more inlet air dividing, sound absorptive rings are supported co-axially within the inlet duct of a jet engine nacelle on a plurality of radially inwardly extending, streamlined struts. In one form of the invention, these struts are telescopically extensible and retractable to move the rings from deployed position concentrically in the air duct to stowed condition within the cowl defining the air duct. In the other forms of the invention each sound absorptive ring comprises a plurality of arcuate acoustical honeycomb panel sections releasably connected at their lateral edges by piano hinge type connectors to narrow longerons supported by said struts, the panel sections and the longerons comprising complementary segments of each sound absorptive ring.

4 Claims, 9 Drawing Figures

Patented May 30, 1972
3,666,043
4 Sheets-Sheet 1
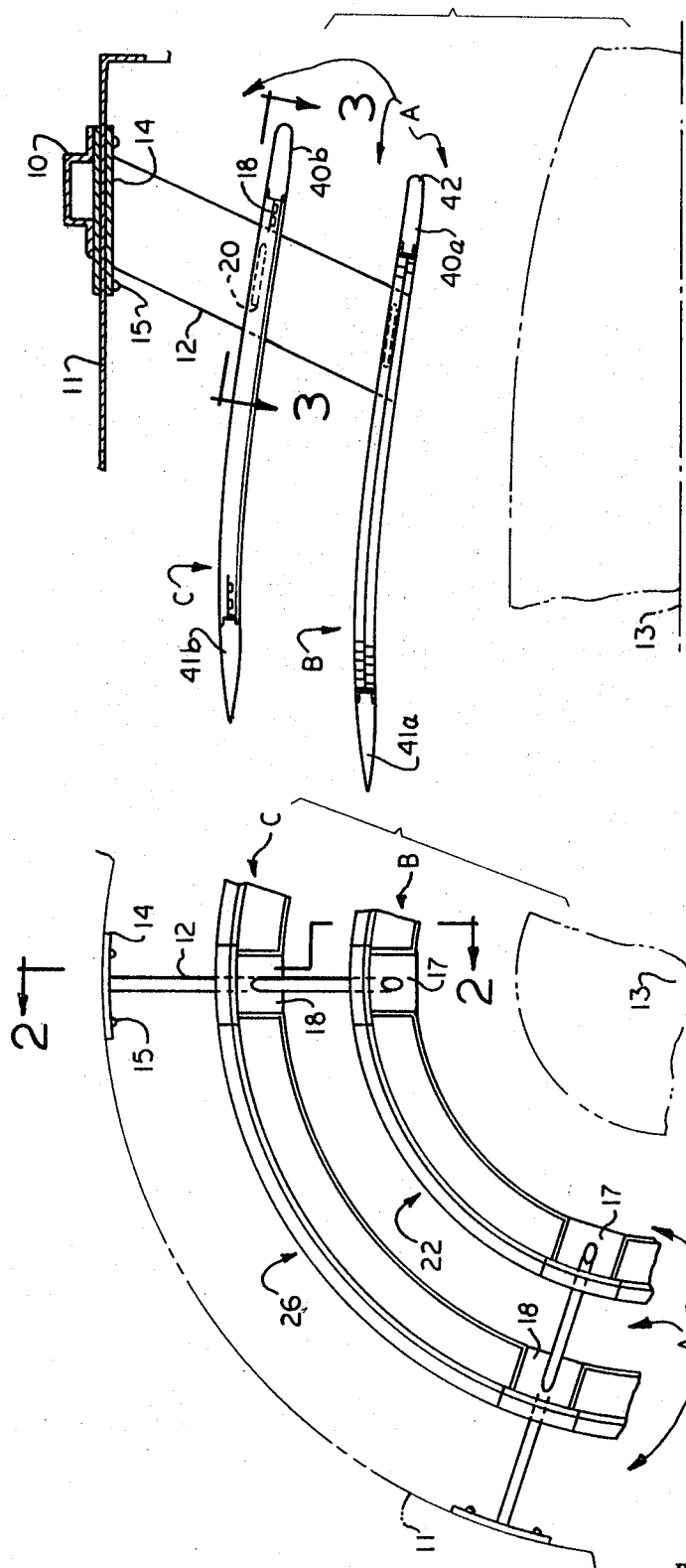
FIG. 1
FIG. 2
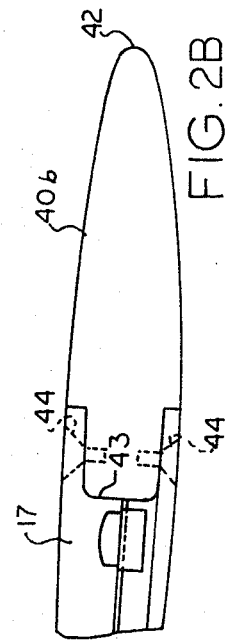
FIG. 2B
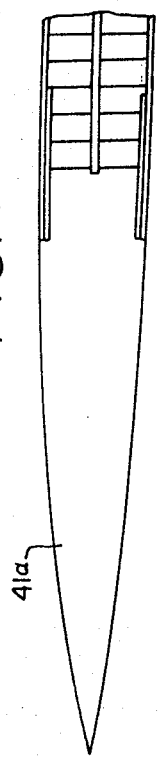
FIG. 2A
INVENTOR.
RODNEY ESCHENBURG
BY George E. Pearson
ATTORNEY Patented May 30, 1972

INVENTOR.
RODNEY ESCHENBURG
BY
George E. Pearson
ATTORNEY

Patented May 30, 1972

INVENTOR.
RODNEY ESCHENBURG
BY
George E. Pearson
ATTORNEY

AIR DIVIDER RING STRUCTURE FOR JET ENGINE INLET AIR DUCT

BACKGROUND OF THE INVENTION

In recent years, the problem of suppressing jet engine noise has been a matter of extreme and increasing urgency. Legislation is now in effect aimed at reducing such noise, and strong forces are working toward even more stringent suppressive measures.

Two principal zones of a jet engine are responsible for most of the objectionable noise emission, one at the inlet end of the engine nacelle where the high speed shearing effect of the fan and stator blades on the inrushing inlet air produces a high pitched siren effect, and the other at the exhaust end where the high velocity exhaust gases have their shearing encounter with the ambient atmosphere.

It is well known that the amount of objectionable noise emanating from the intake end of a jet engine can be attenuated by increasing the internal surface area available for acoustical treatment, and it is not broadly new to mount one or more annular airfoil type members, called "splitter rings", co-axially within the intake duct. However, such rings present serious problems in that they must be rigidly and strongly mounted, with no danger of any portion thereof coming loose as to be swallowed by the engine, while at the same time they should be easily removable, either in whole or in part, for inspection, maintenance or replacement.

SUMMARY OF THE INVENTION

It is a principal objective of this invention to mount one or more streamlined, sound absorptive, inlet air divider rings co-axially within the air inlet duct of a jet engine, the ring or rings being assembled in removable panel segments supported by radially extending struts.

BRIEF DESCRIPTION OF THE DRAWINGS

The foregoing objectives and advantages of the invention will be apparent from the following description and the accompanying drawings, wherein:

FIG. 1 is fragmentary, front, elevational view of approximately one quarter of a two ring assembly embodying one form of the invention as it appears when looking into the upstream end of the intake duct of an engine nacelle in which the rings are mounted, the nacelle cowling being removed, the inner face of the cowling and the nose cone being indicated in broken lines.

FIG. 2 is a sectional view taken along offset line 2—2 of FIG. 1.

FIGS. 2A and 2B are fragmentary, enlarged sectional views through the trailing and leading end portions, respectively of one of the splitter rings.

DETAILED DESCRIPTION

Figure 3:
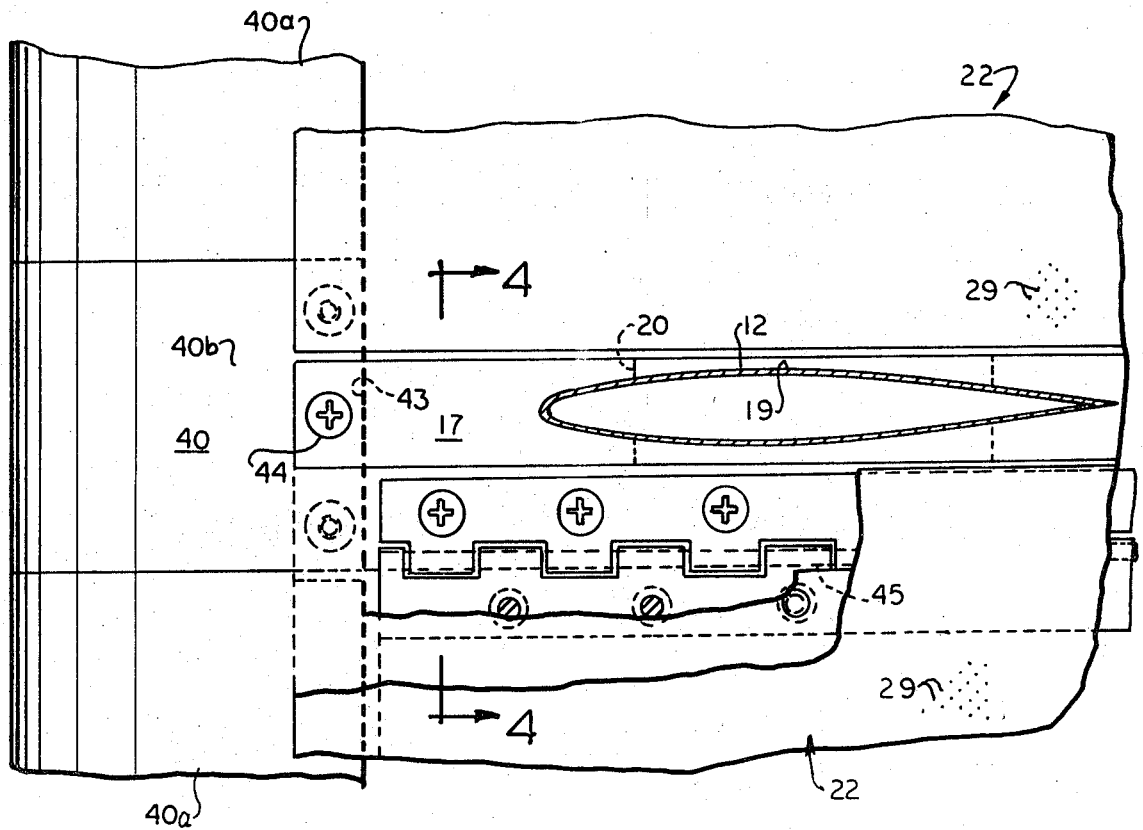
FIG. 3 is an enlarged, fragmentary, sectional view taken along line 3—3 of FIG. 2, portions being broken away to show the piano hinge type connection between the honeycomb panels and the longerons.

Referring to the drawings in detail, and considering first the form of the invention shown in FIGS. 1-4, the inlet duct A of a conventional jet engine nacelle is defined by a hat section reinforcing band 10, see FIG. 2, encircling a conventional cowling structure 11.

A plurality of five identical struts 12 of streamlined, longitudinal sectional shape are mounted in the inlet duct A along symmetrically angularly spaced radial planes from the inlet duct axis 13. Each strut 12 has a mounting plate 14 on its radially outward end secured to the cowling 11 by removable fasteners 15. Each strut 12 is hollow, and may be of drawn or extruded metal, or formed from suitable sheet metal such as stainless steel, titanium, or aluminum alloy. The struts 12, as shown in FIG. 2, are raked back toward their inner ends approximately 25° from a radius from the inlet duct axis.

Two longerons 17 and 18 are mounted on each strut 12, one longeron 17 being mounted on the radially inward end of the strut, and the other 18 at a desired or designed intermediate location. The longerons, like the air divider rings B and C of which they constitute narrow segments, are shaped in longitudinal section to conform to the normal flow of inlet air through the inlet duct A. Since both air divider rings B and C are generally similar to each other only the structural details of the inner ring B will be described in detail herein.

Figure 4:
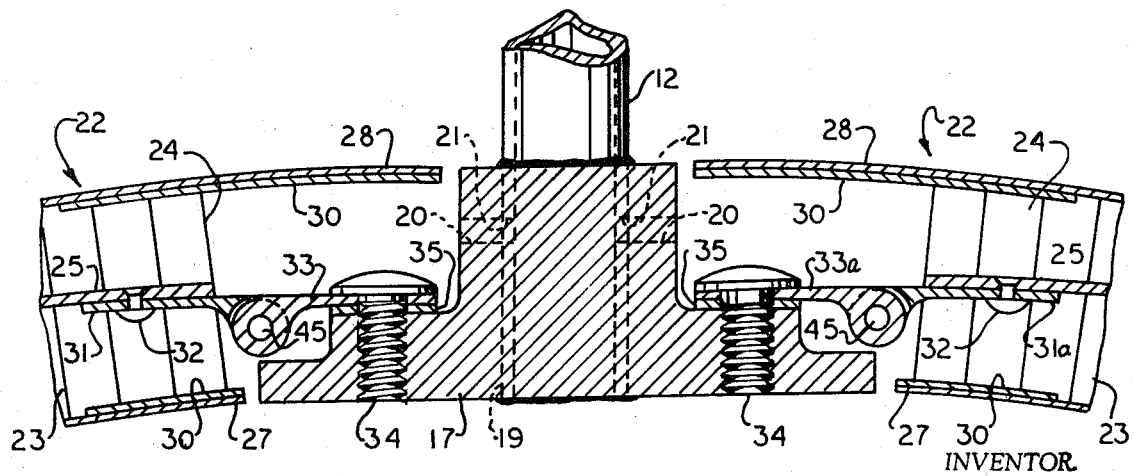
FIG. 4 is a further enlarged, fragmentary, sectional view taken along line 4—4 of FIG. 3.

Each longeron 17 is of generally inverted "T" cross sectional shape as shown in FIG. 4, and has a strut receiving hole 19 therethrough, see FIGS. 3 and 4, shaped to receive the strut 12 in fitted relation therein. Each strut 12 is inserted a required distance in each of its two longerons 17 and 18 as shown in FIG. 2, and the longerons are welded to the strut around the top and bottom of each strut-receiving opening in each longeron.

An elongated opening 20, see FIGS. 2 and 4, is provided in each side of each longeron to open into the hollow interior of the struts mounted therein, and matching opening 21, see FIG. 4, is provided in each side of each strut to register with these openings 20 in the longerons when the longerons are mounted on the strut. The openings thus provided into the hollow interior of each strut provide a path for anti-icing air.

A plurality of transversely curved, segmental, honeycomb panels 22 are fitted in complementary relation between the longerons 17, so that the complemental segments defined by the longerons 17 and panels 22 form the air divider ring B.

Each panel 22, as best shown in FIGS. 3 and 4, comprises two layers 23 and 24 of honeycomb core material in back-to-back relation on opposite sides of a common intermediate or backing layer 25, and a pair of face sheets 27 and 28, spaced from the backing sheet 25 by the honeycomb cores 23 and 24, respectively, to provide resonant cavities between the face sheets and the backing sheet. The two face sheets 27 and 28 are of light gauge metal, and have a multiplicity of small holes 29 therethrough, see FIG. 3, in an overall pattern in accordance with common practice for this type of sound absorptive material. Usual doubler strips 30 are provided along exposed marginal areas of the face sheets 27 and 28 for reinforcing. The face sheets 27 and 28, doubler strips 30, honeycomb cores 23 and 24 and the central backing sheet 25 are secured together in closely superposed relation as shown in FIGS. 2 and 4 by conventional means, such as brazing. Distinguishing the structure of the panels 22 from usual practice is the thickness of the central backing sheet 25, which is of relatively thick, structural sheet material.

For mounting the panels 25 between adjacent longerons 17, each panel 25 has two half portions 31 and 31a, see FIGS. 3 and 4, of a piano hinge type member firmly secured, by rivets 32 or other suitable means, such as bonding or brazing, one to each lateral edge thereof. The complementary half portions 33 and 33a of said piano hinge type members are secured, respectively, by machine screws 34 to the lateral offset or head portions 35 and 35a of each inverted T-shaped longeron 17. A shim strip 35 of selected thickness is interposed between each longeron hinge half portion 33 and 33a and its associated longeron 17 to bring the face sheets of the panel flush with the faces of the longeron laterally adjacent thereto. The outer face sheet 28 of each panel 22 and its doubler strip 30 extends beyond the core 24 a sufficient distance to substantially close the gap between the face sheets 28 and the stem portion of the inverted T-shaped longeron 17. The abutments of the piano hinge type half portions 33 and 33a of each longeron 17 are so positioned, relative to the abutments on the piano hinge type half portions on the panels 22 to which they are connected as to fit therebetween in relatively interdigitated relation, with the hinge pin holes in both sets of abutments in substantial alignment with each other to receive a hinge pin 45 to securedly attach the panels in complementary relation between the respective longerons.

Streamlined terminal fairings 40 and 41 are provided on the upstream and downstream ends, respectively, of both air divider rings B and C. The nose fairing 40 for the upstream or leading edge of the ring B comprises a plurality of longeron nose portions 40a, and panel nose portions 40b.

Figure 6:
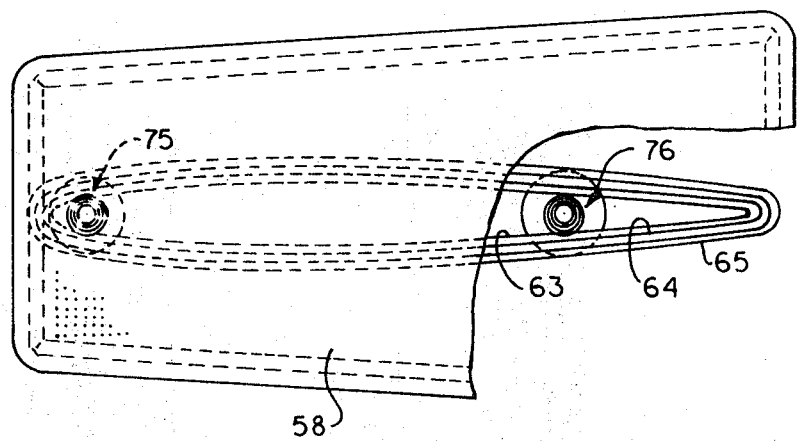
FIG. 6 is a fragmentary plan view of the radially inward side of FIG. 5, which is the top side as shown in FIG. 5, a portion being broken away.

Each longeron nose portion 40b, see FIGS. 3 and 6, is of the same width as the base of the longeron 17 upon which it is mounted, and is rounded at its leading end 42, see FIG. 6. The downstream end of each longeron nose fairing 40b is fitted into a notch 43, see FIG. 6, provided therefore in the upstream end of its associated longeron 17, and is connected thereto by screws 44. Each longeron nose fairing 40b fits flush with the outer surfaces of its respective longeron.

A panel nose fairing 40a, generally similar in longitudinal section to the longeron nose fairing 40b, is secured in a notch provided therefor in the leading edge of each panel.

Tail fairings 41a and 41b are similarly mounted in the downstream end of each longeron 17 and panel 22, the downstream end of each tail fairing terminating in a usual edge 47. The nose and tail fairings in the longerons 17 and panels 22 fit together in edge-to-edge, complementary relation as shown in FIGS. 1 and 3 to comprise annular fairings in flush, interfitted relation with their respective longerons and panels.

OPERATION

The air divider ring assembly shown in FIGS. 1–4, comprising the five struts 12 with their two sets of longerons 17 and 18, and two sets of complementary, interfitted panels 22 and 26, with their nose and tail fairings mounted thereon, is mounted co-axially in the inlet air duct A of a jet engine nacelle, and is fixedly secured therein by the rivets 32 or other suitable mounting means. Any instrumentation required is usually accomplished before assembly and installation, and the instrument wires are brought into one or more selected struts 12 through aligned openings 20 and 21, and thence outwardly through the outer ends of the struts.

In the event that maintenance or inspection subsequently requires the removal of one or more of the panels 22 or 26, the longeron nose fairings 40b or the tail fairings 41b, or both, of the longerons on each side of each such panel are removed, and the hinge pins 45 are withdrawn, thereby freeing the panel or panels for removal. The panel or panels, or replacements therefor, are replaced by reversing the foregoing procedure.

MODIFIED FORM OF INVENTIONS FIGS 5–7

Figure 5:
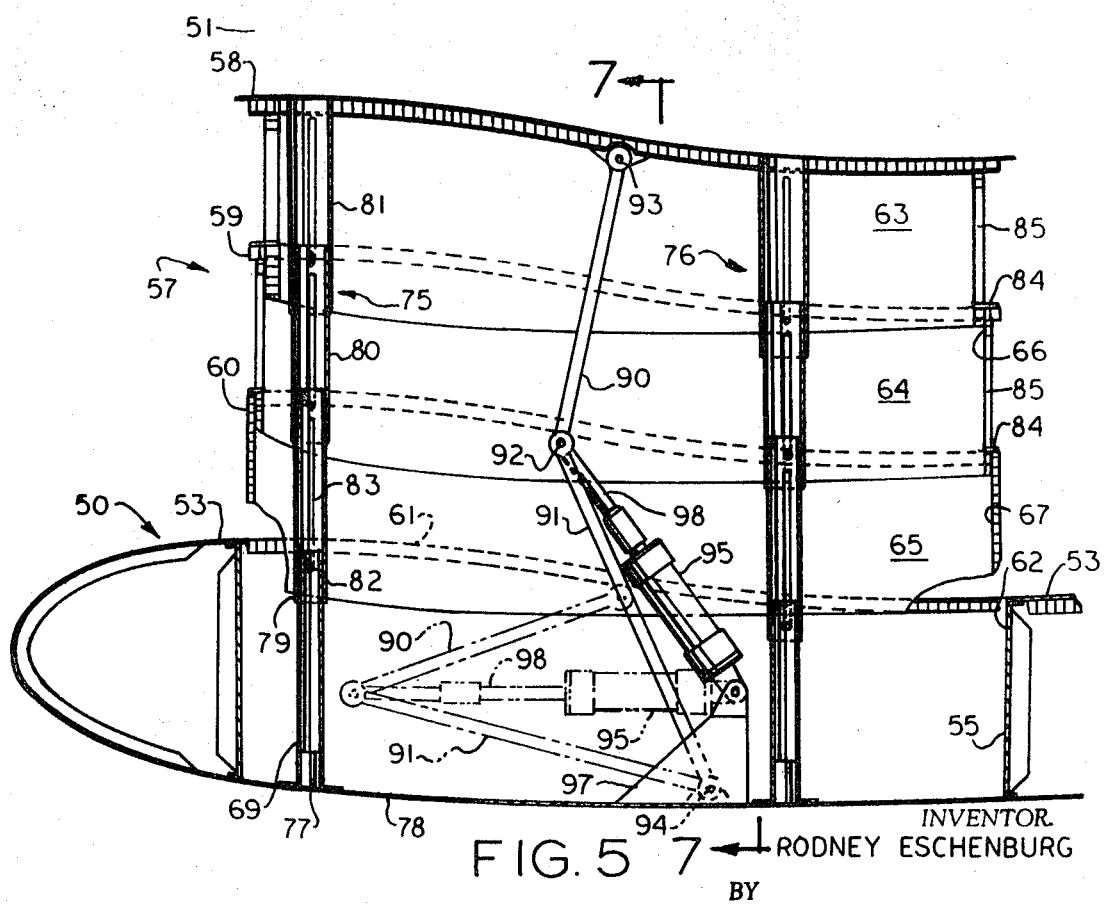
FIG. 5 is a fragmentary, longitudinal sectional view on a radial plane through one side of the annular air inlet passage of an airplane jet engine pod having a modified form of the invention embodied therein.
Figure 7:
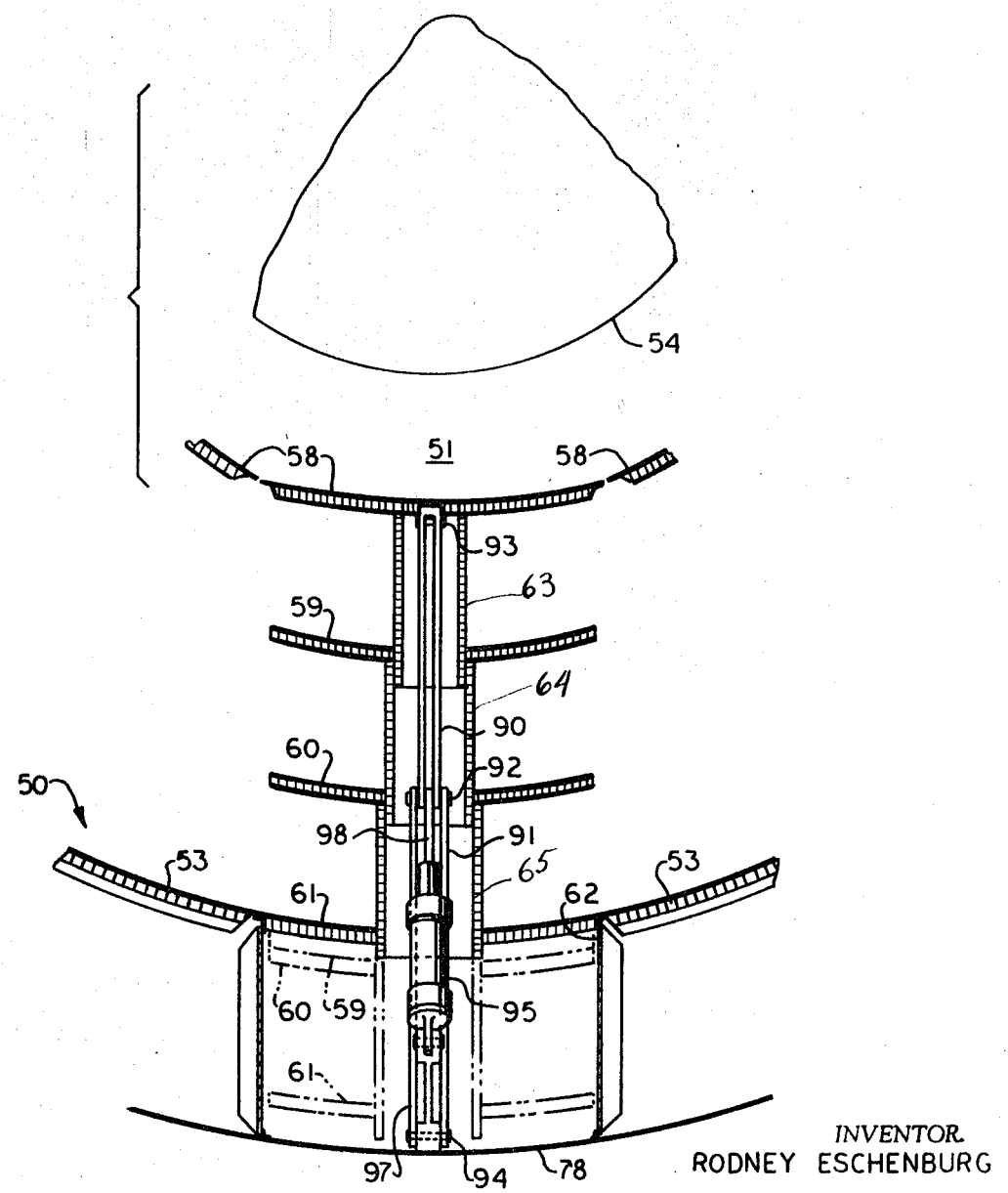
FIG. 7 is a sectional view taken along line 7—7 of FIG. 5.

Referring now to the form of the invention shown in FIGS. 5–7, the forward end portion of a conventional cowling 50 defining the annular air inlet duct 51 for an aircraft jet engine, not shown, has an inner wall 53 of suitable sound absorptive material, for example, formed, acoustical, honeycomb sandwich panel material of a well known type referred to previously herein. The usual axial nose cone 54 also preferably is faced with acoustical honeycomb core sandwich or other sound absorptive material in accordance with common practice where sound suppression is required.

A plurality of splitter ring panel stowage pockets 55 are formed in the cowling inner wall 53, and a panel set 57 which consists, in the present instance, of three splitter ring panels 58, 59 and 60 and a closure panel 61, are housed in each of said pockets.

Each pocket 55 extends lengthwise of the inlet duct 51 and its size and shape are determined by the innermost panel 58 of a panel set 57 to be housed therein. The pockets 55 are distributed symmetrically about the axis of the inlet duct.

As used herein "inner," "inward" and words of similar connotation mean "toward the inlet duct axis," while "outer," "outward," etc. mean the reverse.

In their retracted position the panels of each set are housed in their respective pockets 55 with the inner panel 58 flush-mounted in fitted relation in an opening 62 in the cowling inner wall 53, which opening comprises the opening of the pocket. The surface configuration of each inner panel 58 is such as to complement and conform substantially to that of the cowling inner wall 53 when the panels are retracted to stowed position in their respective pockets 55 as shown in broken lines in FIG. 7.

Each innermost panel 58 has an elongated, streamlined strut wall 63, of acoustical honeycomb sandwich panel material integrally mounted on the radially outward side thereof, and this strut wall fits for free telescopic movement within a similar, but larger strut wall 64 formed on each intermediate splitter panel 59. Each panel 59 is substantially similar in shape, size and surface configuration to the innermost panel 58, with the exception that the intermediate panel has an opening 66 therein to receive the strut wall 63 of the innermost panel 58 therein.

The third splitter ring panel 60 of each set in turn is generally similar in size, shape and surface conformation to the intermediate panel 59 and has a streamline strut wall 65 thereon, and an opening 67 therein to receive the strut wall 64 of the intermediate panel 59 telescopically therein. Additionally, an outer closure panel 61 is secured near the lower end of the strut wall 65 of each third splitter panel 60, and is of a size, shape and surface conformation, and is so mounted on its strut wall 65, that when the panels are deployed as shown in FIG. 5 and in solid lines in FIG. 7, each outer closure panel 61 fits into and closes its respective pocket opening 62 in the inner cowling wall 53.

For guiding and supporting the panels of each set during deployment and retraction, a pair of telescoping guide tube assemblies 75 and 76 are provided. Since the two sets of telescoping tubes are similar, only the forward one 75 is described in detail. A fixed stud 77 is secured to the outer wall 74 of the cowling 50, and a fixed tube 69 is fixedly secured thereon. A first telescoping tube section 79, is mounted in relatively telescoping relation on the fixed tube section 69, and other telescoping tube sections 80 and 81 are mounted in successive telescoping relation on the tube section 79, the final tube section 81 being fixedly secured at its upper end to the innermost panel 58.

A stop pin 82 is provided near the top of the fixed tube 69, and rides in a slot 83 provided in the tube 79 to limit axial separative, telescoping movement of the tube 79. Similar pins and slots are provided for the other telescoping tubes 80 and 81. Also, pins 84 riding in slots 85 provided in the strut walls limit the telescopic projection of the strut walls in a similar manner to position the panels of each set in their deployed position.

It will be apparent that more positive acting and sophisticated mechanism will probably be preferred for guiding the panels between their deployed and stowed positions, but such mechanism is not a feature of the present invention, and will be designed in accordance with the requirements of each type of installation in which the invention is to be embodied.

For actuating the panels of each set 57 between their stowed and actuated positions, a pair of actuator links 90 and 91 are pivotally interconnected at 92. The inner link 90 is also pivotally connected at 93 to the innermost panel 58, and at 94 to the outer cowling wall 78. Link actuating means comprises a hydraulic or pneumatic cylinder 95 pivotally mounted on a standard 97 secured to the cowling outer wall 78. The piston rod 98 of the cylinder 95 is pivotally connected to the link join 92, and actuation of the cylinder 95 moves the links between their solid and broken line positions of FIG. 5 to move the panels between their deployed, solid line position of FIGS. 5 and 7, and their stowed, broken line position of FIG. 7.

Each innermost panel 58 is so shaped, and its position upon deployment is so calculated, that in their deployed, solid line position shown in FIG. 5 and in solid lines in FIG. 7, these inner panels are substantially in lateral edge-to-edge, supplemental relation as shown in FIG. 7 to form a complete, but not quite circular splitter ring.

The other splitter panels 59 and 60 of each set are spaced laterally edgewise from each other, even when deployed, as is shown in FIG. 7, and thus comprise segments defining additional sound absorptive splitter rings having gaps or spaces between adjacent panels.

The outer closure panels 61, being integrally secured to their respective strut walls 65, are elevated upon deployment of their respective panels 60, to fit into and close the pocket opening 62 in the inner cowling wall 53, in which position they conform to the curvature of said inner wall. All of the panels are formed lengthwise to conform to the normal flow of inlet air thereover during operation of the engine so as to minimize stresses on the panels as well as interference with air flow through the inlet duct.

OPERATION OF FORM OF FIGS. 5–7

In the form of the invention shown in FIGS. 5–7, with the piston rod 98 extended as shown in broken lines in FIG. 5, the panels 58, 59, 60 and 61 of each panel set 57 are retracted to stowed position as shown in broken lines in FIG. 7, in which position the stop pins 82 and 84 are at the radially inward ends of their respective slots, and the radially innermost panel 58 is fitted into the opening 62 in the cowling inner wall 53 and the air inlet duct 51 is thus entirely clear and unobstructed. This stowed condition of the panels provides maximum efficiency for flight beyond the environs of an airport, where noise emission is not a serious problem.

For landing approach and takeoff, where maximum sound absorption is required, the cylinder 95 is actuated to retract the piston rod 98 and thereby extend the links 90 and 91 to their solid line position of FIG. 5. This extends the telescopically interfitted strut walls 63, 64 and 65 and the telescopic tubes 75 and 76 to their deployed position shown in FIG. 5 and in solid lines in FIG. 7. Engagement of the stop pins 82 and 84 with the radially outward ends of their respective slots limits the radially inward deployment of their respective panels to their designed, deployed positions.

In their deployed positions both sides of each of the panels 58, 59 and 60, as well as the outer face of the outer closure panels 61 absorb sonic energy in a well known manner as do also the strut walls 63, 64 and 65 while at the same time the panels 58, 59 and 60 tend to smoothen the flow of inlet air through the inlet duct 51 and into the usual compressor turbine, not shown, of the engine upon which the air inlet duct 51 is mounted. Such smoothening of the inlet air flow reduces turbulence, which, at high velocities, itself tends to generate noise.

The invention provides a strong, safe, rigid, annular air divider or "splitter ring" structure which adds substantially to the area available within the inlet duct for sound absorptive treatment, and does not substantially adversely affect either engine performance or drag.

Having described my invention, what I now claim and desire to protect by Letters Patent of the United States of America is:

1. Sound suppression mechanism for an aircraft jet engine having a cowl with an annular inner wall defining an air inlet duct co-axially of and forwardly of the engine, said mechanism comprising:

a plurality of panel receiving pockets formed in symmetrically, circumferentially spaced relation in the cowl inner wall, a set of splitter ring panels of a size and shape to fit, in relatively superposed, stowed relation, into each pocket, extensible strut means mounted in each pocket and operatively connected to the panels in each pocket, each strut means being extensible from stowed position, with the panels of its respective set stowed in their respective pocket, to extended position with corresponding panels of each set deployed at equally spaced intervals from the cowling, and co-axially of the air inlet duct, whereby the corresponding panels of each set define an annulus co-axial with each other and with the air inlet duct.

2. Sound suppression mechanism as defined in claim 1 wherein the innermost panel of each set is of a size and shape to have lateral, edgewise, contacting relation with the lateral edges of the innermost panels on both sides thereof with the panels in deployed position.

3. Sound suppression mechanism as claimed in claim 1 wherein the panels of each set comprise at least an inner splitter ring panel shaped to fit into and to close the opening into its respective pocket with the panels in their stowed position, and an outer closure panel shaped to fit into and to close the opening into the pocket with the panels in their deployed position.

4. Sound suppression mechanism as defined in claim 3 wherein at least one splitter ring panel is provided intermediately of each inner panel and its respective outer closure panel, and the outer closure panel is fixedly connected in spaced relation to such intermediate panel.

\* \* \* \* \*